United States Patent [19]

Berg

[11] 3,871,208
[45] Mar. 18, 1975

[54] VALIDATED DROP TEST APPARATUS
[75] Inventor: Joseph E. Berg, Los Angeles, Calif.
[73] Assignee: Precision Thin Film Corporation, Los Angeles, Calif.
[22] Filed: Feb. 20, 1973
[21] Appl. No.: 333,756

[52] U.S. Cl. .................................................. 73/12
[51] Int. Cl. ........................................... G01n 3/30
[58] Field of Search .................................. 73/12, 82

[56] References Cited
UNITED STATES PATENTS

| | | | |
|---|---|---|---|
| 2,496,420 | 2/1950 | Stern | 73/12 |
| 2,809,514 | 10/1957 | Corcoran | 73/12 |
| 3,488,991 | 1/1970 | Dietert et al | 73/12 |
| 3,538,743 | 11/1970 | Glidden | 73/12 |
| 3,576,127 | 4/1971 | Weitzel | 73/12 |
| 3,724,260 | 4/1973 | Bole | 73/12 |

Primary Examiner—James J. Gill
Assistant Examiner—Anthony V. Ciarlante
Attorney, Agent, or Firm—Henry M. Bissell

[57] ABSTRACT

A validated drop test apparatus is provided which includes a light shielded channel, such as a tube, with a drop weight releasably held therein above a test specimen such as an eyeglass lens. Weight detection means disposed below the drop weight activate an indicia marking device when the drop weight passes the detection means, so that the occurrence of a drop test is recorded.

9 Claims, 8 Drawing Figures

3,871,208

VALIDATED DROP TEST APPARATUS

BACKGROUND OF THE INVENTION

1. Field of the Invention

The present invention generally relates to test apparatus and more particularly to drop weight impact testing apparatus.

2. Prior Art

Various forms of drop weight testing apparatus have been used to test the impact resistance of such objects as eyeglass lenses, electronic equipment and instrumentation, etc. Such test apparatus can measure the strength, shock resistance and durability of the test object under controlled conditions. Extensive use has been made of such test apparatus where safety is of primary concern.

It will be appreciated that eye protection is of primary importance to the public. Eyeglasses are worn by a large proportion of the population, and those wearing the same, when involved in accidents, frequently experience eyeglass breakage. During a substantial percentage of such accidents, the eyeglasses are not separated from the face, but instead, are smashed against the eye area, for example, in auto collisions when the driver's or passenger's head is impelled against the dashboard, etc. Falls of eyeglass wearers also frequently involve smashing of the eyeglasses while still in place near the wearer's eye. In such accidents, shattering of the eyeglasses represents a real and substantial danger to the wearer's face, particularly the eyes, since puncturing of the eyeball, scratching, displacement or tearing of the cornea or lens and the like from glass shards can permanently damage the eye or cause blindness.

Accordingly, efforts have been made to upgrade the impact resistance of eyeglass lenses and to require (by regulation) that eyeglass lenses pass certain drop weight impact tests. Such regulations are not yet fully in force and it is usual for eyeglass lens manufacturers, opticians and the like who provide prescription lens to perform such tests only on certain and not all of their eyeglass lenses. Even when such impact tests become mandatory, it would be desirable to require, by mechanical means, that each lens is tested, so that the eyeglass purchaser can assure himself that impact regulations and quality control were strictly adhered to. Unfortunately, the usual drop weight impact testing machines have no provision for validating such tests.

SUMMARY OF THE INVENTION

The advantages of a drop weight testing apparatus having means for validating the occurrence of the test for each object tested are provided by the apparatus of the present invention. Such apparatus is substantially as described in the Abstract above. It has particular significance for use in tests on relatively fragile test objects such as eyeglass lenses and the like, where any such lens passing the test will be undamaged and will have validation means to show the test was run, while lenses failing the test will be discarded in damaged or broken condition. Supplemental means may be incorporated in the apparatus if desired, whereby failure to pass the test will automatically result in voiding of the validation evidence, or failure of the validation evidence to be recorded. In any event use of the apparatus of the invention will assure testing of all objects subsequently sold or tested, thereby increasing the safety factor for such objects.

BRIEF DESCRIPTION OF THE DRAWING

A better understanding of the present invention may be had from a consideration of the following detailed description, taken in conjunction with the accompanying drawings, in which.

DESCRIPTION OF THE PREFERRED EMBODIMENTS

First Embodiment

Figure 1:
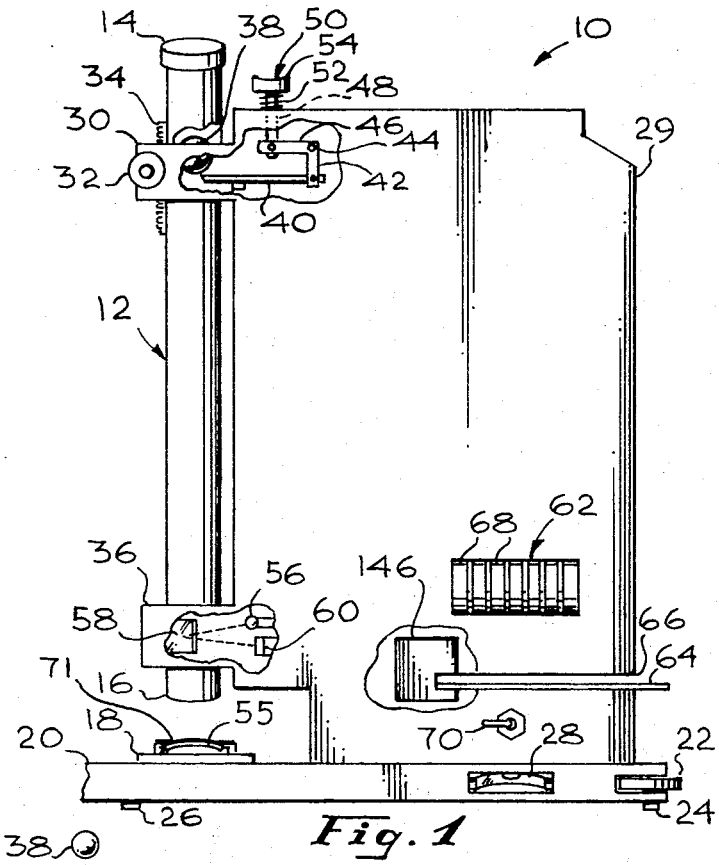
FIG. 1 is a front elevation of a first preferred embodiment of particular validated drop test apparatus of the invention with portions broken away to illustrate certain internal features thereof.

The apparatus illustrated schematically in the elevational view of FIG. 1 comprises the first embodiment of the device of the invention. As shown in FIG. 1, a validated drop test apparatus 10 includes a light shielded channel in the form of a hollow cylindrical tube 12 having a removable top 14 and an open bottom end 16 disposed in spaced relation above test object holding means in the form of a bracket 18. Bracket 18 is disposed on a support 20 equipped with levelling means, including a thumb wheel 22 connected to one or more threaded vertically movable legs 24 along one side of support 20, and fixed legs 26 along the opposite side of support 20. Support 20 also includes a bubble level 28 to aid in levelling the support 20.

Also secured to the upper surface of the support 20 is a housing 29 to one side of which tube 12 is secured by a bracket 30. Tube 12 is vertically adjustable relative to support 20 by a thumb wheel 32 extending through bracket 30 and engaging a toothed rack 34 on the outer wall of tube 12. Accordingly, the effective impact force can be adjusted while still using the same drop weight. Tube 12 is also slidably disposed within a collar bracket 36 secured to the lower portion of housing 29.

Apparatus 10 is also provided with a drop weight in the form of a weighted ball 38 reliably disposed in light-sealing sliding engagement within tube 12 on a drop weight release means comprising a horizontal support arm 40 extending from housing 29 into tube 12 across at least a portion of the width thereof. Support arm 40 is pivotably connected in housing 29 to one arm 42 of an L-bracket 44, the other arm 46 of which is secured to the vertical stem 48 of a ball release button 50. Button 50 has a spring 52 disposed around stem 48 between housing 29 and the upper horizontal surface 54 of the button 50 so that downward pressure exerted on surface 54 retracts the arm 40 from the hollow interior of tube 12 to allow the ball 38 to descend along tube 12 and perform an impact test on a test object such as a lens 55 in holder 18. Thus the resistance of lens 55 to damage or cracking can be determined by this test. Release of downward pressure on surface 54 allows the spring 52 to force the button 50 upwardly, thus sliding the arm 40 into a ball-holding position in tube 12 to allow the next test to be performed when the ball 38 is replaced in tube 12. If desired, a solenoid actuated, ball release mechanism (known in the art) may be employed instead. Such a mechanism may be controlled by interlock circuitry (see FIG. 8 and related description) for added validation protection.

Weight detection means are disposed in association with a point in tube 12 below arm 40 to detect passage of the ball 38 down tube 12. Such weight detection means may include, as shown in FIG. 1, light projecting means in the form of a light 56 extending from the housing 29 through aligned apertures (not shown) in bracket 36 and tube 12 and capable of projecting a beam of light across tube 12 onto the surface of light reflecting means, such as a mirror 58. Mirror 58, in turn, reflects the beam through apertures (not shown) in tube 12, bracket 36 and housing 29 to light detection means such as a photo cell 60 or the like disposed in housing 29.

Figure 4:
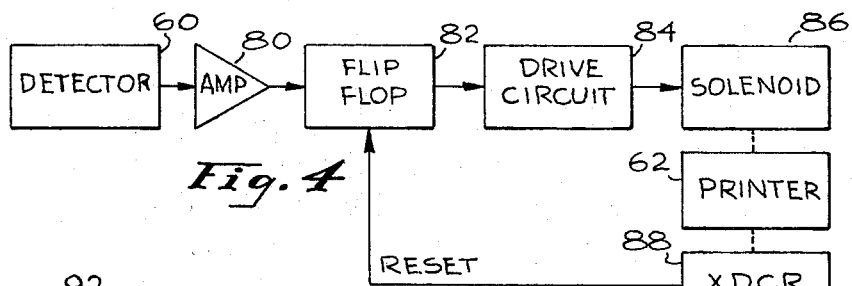
FIG. 4 is a block circuit diagram for the apparatus of FIG. 1.

Interruption of the light beam by passage of the ball 38 past the light beam point results in a momentary loss of electrical output from the cell 60. This change of state of cell 60 can be used (through conventional circuitry such as a solenoid switching means or the like, not shown) to activate indicia marking means, such as an electrically powered imprinter 62 disposed in housing 29, causing imprinter 62 to mark indicia on paper 64 or other suitable medium releasably disposed in a slot 66 defined in housing 29. Thus recordation and validation of the fact that a test was performed automatically takes place. Imprinter 62 may be provided with means such as date and time set wheels 68 for sequentially varying the indicia recorded, as desired. The imprinted paper 64 can be included in packaging with the lens 55 after the test to verify passage of the test. Suitable circuitry and power means as shown in FIG. 4, are provided to power the light 56 and imprinter 62. A toggle switch 70 may be provided to turn apparatus 10 off and on.

As a further protection against fraud in the validated drop test apparatus in accordance with the present invention, a marking film 71 may be incorporated, placed over the lens 55 to provide a mark on the lens when impacted by the drop weight. This film 71 may comprise a strip of paper or the like, impregnated with ink-filled micro-balloons which would be ruptured by the impact of the drop weight to release the ink therein and provide an imprint on the lens 55. In such an arrangement, both the paper 64, which may be the lens prescription itself, and the lens 55 are marked with suitable indicia at the time the lens 55 is tested by the apparatus 10.

Figure 2:
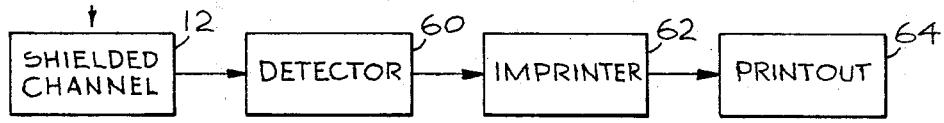
FIG. 2 is a block diagram of an operation sequence for the apparatus of FIG. 1.

FIG. 2 schematically depicts in block diagram form the sequence of operation of apparatus 10, wherein passage of ball 38 through shielded channel 12 changes the state of detector 60 which in turn causes the imprinter 62 to print out a record of the drop ball test. It is contemplated that, for most purposes, the components of apparatus 10 will be largely housed in a so-called tamper-proof housing 29 so that unauthorized validations cannot be made. Accordingly, an improved drop weight testing apparatus with automatic validating means is provided.

Second Embodiment

Figure 3:
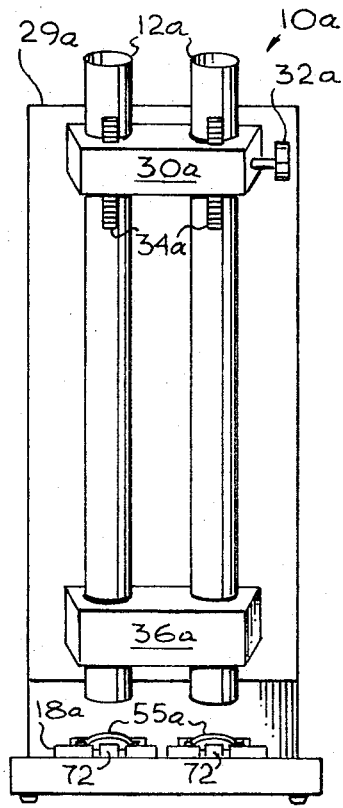
FIG. 3 is a left side elevation of a variation of the embodiment of FIG. 1 equipped for testing two lenses at a time.

A second preferred embodiment is illustrated in left side elevation in FIG. 3 of the accompanying drawings. Inasmuch as the apparatus shown in FIG. 3 is physically similar to apparatus 10, like components bear the same numerals in FIG. 3 as in FIG. 1, but are succeeded by the letter a. It will be noted, however, that the apparatus 10a of FIG. 3 includes two tubes 12a and dual detection apparatus for testing a pair of lenses 55a simultaneously.

Additionally, apparatus 10a is provided with means which are responsive to a test failure and which automatically either block validation or invalidate a test recordal already made. In this regard, for example, a pressure sensitive device 72 such as a pressure transducer, piezoelectric device or simple pressure contact switch can be disposed immediately below the test object, i.e., lens 55a, so that if lens 55a breaks, pieces of lens 55a will be impelled against device 72 and cause a change of state which is in turn transmitted in a circuit, indicated schematically in FIG. 5, to imprinter 62a to either block print-out or to inject additional print-out invalidation indicia on paper 64a. Accordingly, paper 64a cannot subsequently be used to fraudulently validate an untested lens or the like. Accordingly, an improved drop weight test apparatus with automatic validation and invalidating means is provided.

FIG. 4 illustrates in block diagram form details of electrical circuitry for the embodiment of FIGS. 1 and 2. The detector 60 develops an output signal which is amplified in the amplifier 80 and applied to set a flip flop 82 which in turn energizes a drive circuit 84 coupled to a solenoid 86. When actuated, the solenoid 86 moves the printer 62 to imprint or emboss the prescription slip 64 (FIG. 1). Coupled to detect the cycle of operation of the printer 62 is a transducer 88 which develops an output pulse to reset the flip flop 82 so that the circuit is ready for the next drop test cycle.

Figure 5:
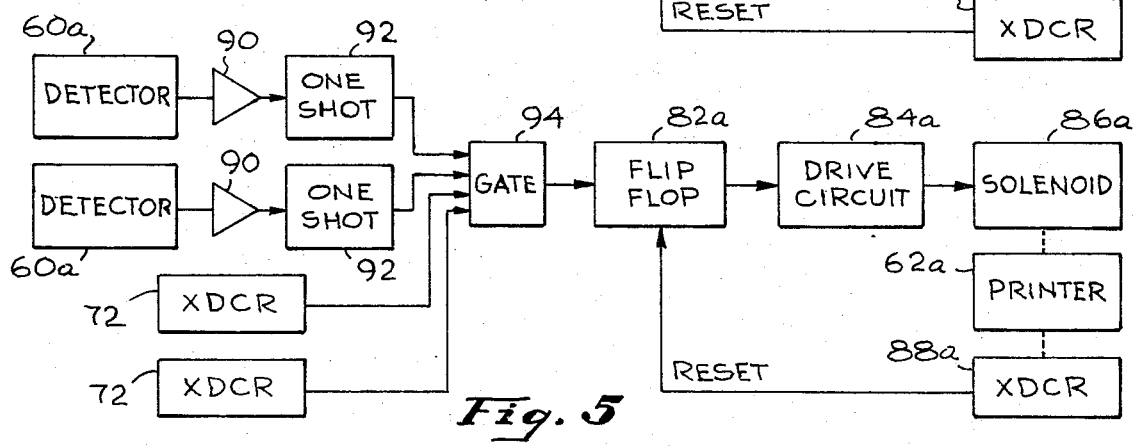
FIG. 5 is a block circuit diagram for the apparatus of FIG. 3.

FIG. 5 is a similar block diagram for the electrical circuitry of the embodiment of FIG. 3. This includes dual detection channels including the duplicate detectors 60a, amplifiers 90, and one-shot stages 92. Transducers 72 are shown coupled with the outputs of the one-shot stages 92 to a gate 94 in order to block actuation of the printer 62a if one of the lenses 55a breaks or if both drop balls 38 are not dropped essentially simultaneously. The remainder of the circuit of FIG. 5 operates as described for the corresponding portion of FIG. 4. Although the transducers 72 are shown coupled to block the validation printout when energized, as by the breaking of a lens 55a, they may as well be connected to the printer 62a to cause the printer to print additional indicia invalidating the prescription form 64. In any event, the system of FIGS. 3 and 5 is effective in preventing the spurious generation of a validated prescription form 64.

Third Embodiment

Figure 6:
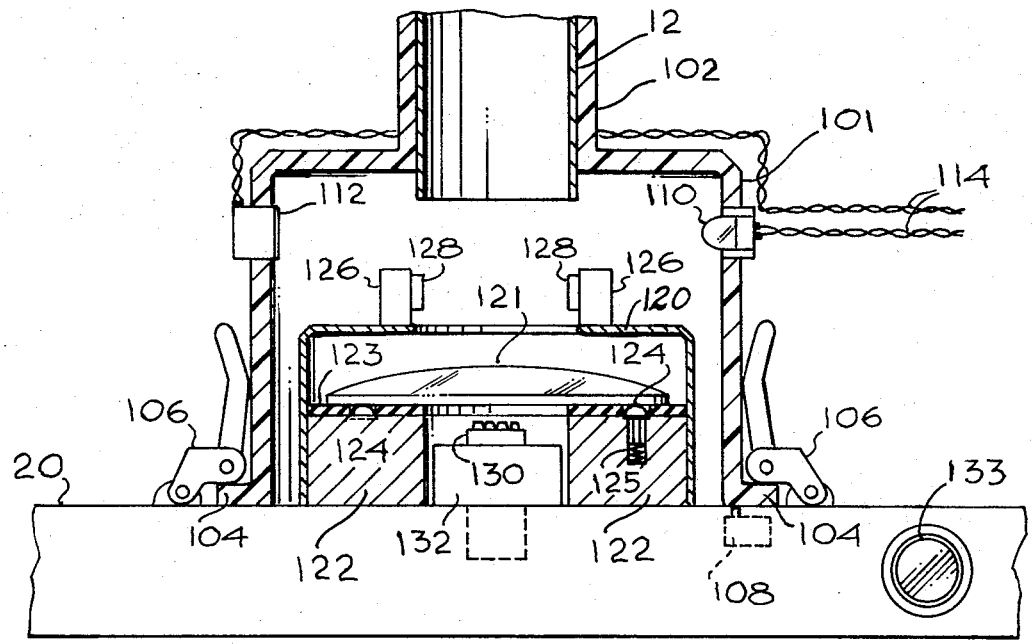
FIG. 6 is a sectional view of a portion of apparatus in accordance with the invention, illustrating details of still another embodiment thereof.

Still another embodiment is represented in FIG. 6, which is a sectional view showing particular details of this embodiment. It is to be understood that this may be incorporated in the units 10 and 10a such as are illustrated in FIGS. 1 and 3, FIG. 6 merely showing particular details of the lens mounting and ball detection mechanism near the base of the unit. As shown in FIG. 6, a plexiglass housing 101 is provided to enclose the portion of the apparatus in which the lens is mounted during the drop test. The housing 101 includes a tube or sleeve 102 which encases the ball guide tube 12 with a slip fit, so as to be slidable up and down along the tube 12. The housing 101 is provided with shoulder portions 104 at its base so as to permit latching the housing 101 in place against the support 20 by means of latches 106. when latched in position, the housing 101 actuates a housing microswitch 108. The housing switch 108 is a transfer switch which provides a resetting signal for a control flip-flop when the housing 101 is latched into position and provides a gate signal when the housing 101 is unlatched and raised away from the support 20. The housing 101 provides a mounting for the lamp 110 and detector 112 which provide the beam and detection mechanism for signalling the passage of the drop ball onto the lens. The lamp 110 and detector 112 have suitable leads 114 connecting them to the associated circuitry of the apparatus.

Within the housing 101 is a guard 120 which is placed over the lens 121 and lens support 122. The lens 121 rests on a resilient layer 123 covering the support 122. Recessed within the support 122 and extending through the layer 123 are a number (preferably three) of pins 124 which are biased outwardly by springs 125 and serve as switch contacts which are closed by the weight of the lens 121 thereon. On the guard 120 is shown mounted a ball trap in the form of electromagnetic elements 126 having pole pieces 128. Centrally located underneath the lens 121 within an opening in the lens support 122 is a marker 130 associated with marker solenoid 132. When energized following the dropping of a drop ball on the lens 121, the solenoid 132 propels the marker 130 upward against the lens to leave an imprint showing that the lens 121 has been tested in apparatus of the invention. A ball drop switch 133 is provided to actuate a solenoid (see FIG. 8) for releasing the drop ball under the control of the validation protection circuitry.

Figure 7:
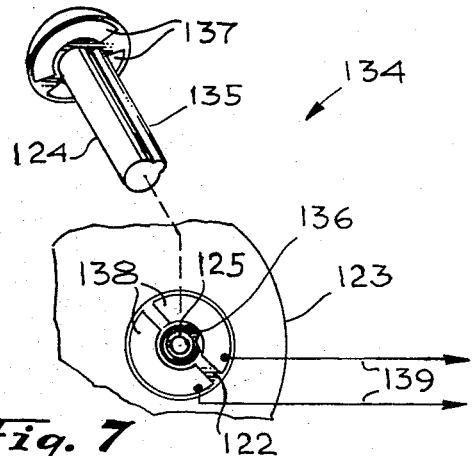
FIG. 7 is a view of a portion of the embodiment of FIG. 6.

The pin 124 and associated elements comprise a lens switch 134, shown in further detail in FIG. 7. In this figure, the pin 124 is shown removed from a recess in the support 122 and resilient layer 123 in order to illustrate details of construction. The pin 124 has a key 135 arranged to enter the keyway 136 to prevent the pin 124 from rotating in its recess. The pin 124 has two conducting strips 137 disposed on the underside of a head portion of the pin 124. Corresponding conducting strips 138 are located on the face of the support 122 around the recess therein. Leads 139 provide circuit connection to the strips 138. When the pin 124 is positioned in its recess within the support 122 and pressed downwardly against the force of the spring 125 (as by the weight of the lens 121 in position thereon) the strips 137 bridge the gaps between the strips 138, thus providing a closed circuit path between the leads 139 via the lens switch 134. Should the apparatus be operated without a lens 121 in position for testing or should the lens 121 break in the test, the switch 134 is not closed and cannot provide any output indication of successful drop test for the lens being marked.

Figure 8:
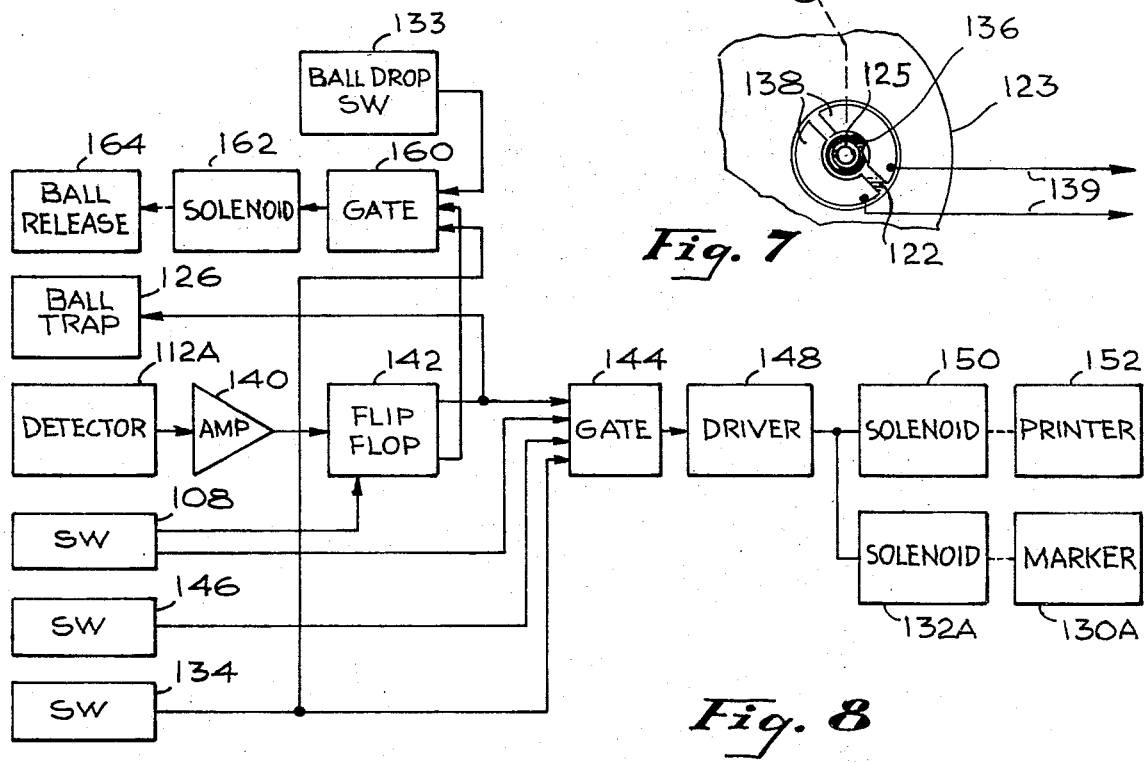
FIG. 8 is a block diagram of circuitry incorporated in the apparatus of FIG. 6.

Reference is now made to the block diagram of FIG. 8 in order to describe the validation protection circuitry for controlling the validating apparatus of the invention as represented in FIG. 6. FIG. 8 illustrates a detector 112A coupled to an amplifier 140 which is connected to a flip-flop 142. The flip-flop 142 is connected to one output of housing switch 108 such that it is reset when the housing 101 is latched in position prior to the drop test. The reset output of the flip-flop 142 is applied to a gate 160 in the ball release circuit, together with a signal from the lens switch 134. The ball drop switch 133 can only activate the ball release solenoid 162 and the associated ball release mechanism 164 via the gate 160 when a lens is in place (closing the lens switch 134) and the housing is latched (resetting the flip-flop 142).

When the ball is released by the mechanism 164, interruption of the light beam from the lamp 110 causes the flip-flop 142 to be set so as to develop an output signal which is used to energize a ball trap 126 and provide one of the input signals to a gate 144. A second input to the gate 144 is provided by the switch 108 when the housing 101 is released from the latched position against the support 20 (FIG. 6) after the ball has been dropped. The third input to the gate 144 is provided by a switch 146 which is physically mounted in the apparatus 10 (FIG. 1) adjacent the card or paper 64 so as to provide the signal to the gate 144 when the card or paper 64 is in position. The switch 146 may be a microswitch or a light-and-photocell combination to detect the presence of the item 64 in proper position for a validation imprint. When all inputs to the gate 144 are true, an activating signal is applied to the driver stage 148 which energizes the solenoid 132A, causing the marker 130A to mark the lens, and the solenoid 150, which activates the printer 152 to imprint the card or paper 64, thus validating the prescription blank for the lens.

With this arrangement, it will be seen that neither of the solenoids 132A and 150 can be energized until three conditions occur: the card or paper 64 is inserted in place, thus activating the switch 146; the lens 121 is in position for testing and survives the test intact; and the housing 101 is released, thus activating the normally closed output of the switch 108. Moreover, release of the housing 101 must have been preceded by latching of the housing 101 against the support 20 in order to operate the switch 108 which opens its normally closed output path but closes the path to its other transfer contact, thus developing a reset signal to the flip-flop 142. Interruption of the light beam as the drop ball passes downward to impact the lens 122 sets the flip-flop 142 which in turn energizes the ball trap 126 to establish a magnetic field to catch the ball on its rebound from impacting the lens 121. The ball is thus held by the trap 126 until the housing 101 is removed and the ball can be picked out of the trap.

It will thus be seen that arrangements in accordance with the present invention provide relatively simple but extremely effective apparatus for insuring that lenses must be tested by ball drop apparatus as prescribed by law before the lens and an associated card or prescription blank can be validated. Although present law requires that all lenses must be so tested, unless exempted by a doctor, the practice is that the drop test is not administered to the bulk of the lenses being manufactured today. The enforcement problems are insurmountable and therefore the law is openly circumvented. Arrangements in accordance with the present invention provide the means by which an effective enforcement can be achieved. The simple evidence is the mark on the lens as well as an imprint on the prescription blank, neither of which can be developed unless the lens has actually been tested.

There have thus been shown and described herein particular embodiments in accordance with the present invention for the purpose of illustrating the manner in which the invention may be used to advantage. However, it will be appreciated that the invention is not limited to such arrangements. Accordingly, any and all modifications, variations or equivalent arrangements which may occur to those skilled in the art should be considered to be within the scope of the invention.

What is claimed is:

1. Drop test apparatus for validating optical lenses comprising:
   a. a light-shielded channel;
   b. a drop ball for testing a particularly positioned optical lens by impact thereon;
   c. drop ball release means releasably holding the drop ball in light-sealing engagement in said channel above the lower end thereof;
   d. a drop ball detector positioned at a point adjacent the channel below the release means for detecting the passage of the drop ball past said point; and
   e. solenoid activated indicia marking means responsive to a signal from the drop ball detector for marking a successfully tested lens and imprinting corresponding indicia on an associated record form identifying said lens.

2. Apparatus in accordance with claim 1 further including enabling circuit means for conditionally controlling the activation of the indicia marking means.

3. Apparatus in accordance with claim 2 further including a removable housing for enclosing the drop ball detector, and one of said enabling circuit means comprising first switching means responsive to the removal of said housing for providing a first circuit enabling condition for activating the indicia marking means only when the removable housing is locked in position against said first switching means.

4. Apparatus in accordance with claim 3 wherein the enabling circuit means further includes second switching means responsive to the presence of the record form for providing a second circuit enabling condition for activating the indicia marking means only upon the presence of the record form in position for imprinting.

5. Apparatus in accordance with claim 4 wherein the enabling circuit means further includes third switching means responsive to the presence of a lens in test position within the housing for providing a third circuit enabling condition for activating the indicia marking means only upon the presence of the lens in the test position.

6. Apparatus in accordance with claim 5 further including gating means coupled between the enabling circuit means and the solenoid activated indicia marking means for insuring the concurrence of enabling signals from said first, second and third switching means in order to activate the indicia marking means.

7. Apparatus in accordance with claim 6 further including electrical circuit means for activating the drop ball release means, said last-mentioned activating means including means for insuring the presence of the lens in the test position and the readiness of the drop ball detector.

8. Apparatus in accordance with claim 1 wherein the indicia marking means for marking a successfully tested lens comprises a movable marker adjacent the lens test position and an associated solenoid for propelling the marker against the lens to leave a mark thereon in response to a signal from the drop ball detector.

9. The method of validating an impact test of an optical lens comprising the steps of:
   directing a drop ball toward a particularly positioned optical lens along a predetermined trajectory;
   detecting passage of the drop ball along said trajectory;
   energizing a first solenoid activated indicia marking means upon detecting passage of the drop ball in order to mark a successfully tested lens; and
   concurrently energizing a second solenoid activated indicia marking means to imprint corresponding indicia on an associated record form identifying the lens being tested.

* * * * *